(12) United States Patent
Beattie, Jr.

(10) Patent No.: US 8,251,851 B2
(45) Date of Patent: Aug. 28, 2012

(54) REMOTE OIL PUMPING SYSTEM FOR AN AUTOMATIC TRANSMISSION

(75) Inventor: James C. Beattie, Jr., Baltimore, MD (US)

(73) Assignee: ATI Performance Products, Inc., Baltimore, MD (US)

( * ) Notice: Subject to any disclaimer, the term of this patent is extended or adjusted under 35 U.S.C. 154(b) by 536 days.

(21) Appl. No.: 12/382,429

(22) Filed: Mar. 16, 2009

(65) Prior Publication Data

US 2009/0257887 A1    Oct. 15, 2009

Related U.S. Application Data

(60) Provisional application No. 61/064,607, filed on Mar. 14, 2008.

(51) Int. Cl.
*F16H 57/04* (2010.01)
*B60K 17/00* (2006.01)
*F04B 49/06* (2006.01)
*F01M 11/00* (2006.01)
*F01M 1/00* (2006.01)
*F01M 5/00* (2006.01)

(52) U.S. Cl. ...... 475/159; 180/339; 417/44.1; 184/6.28; 184/26; 184/104.1

(58) Field of Classification Search .................. 475/159; 180/339; 184/6.28, 26, 104.1; 417/44.1
See application file for complete search history.

(56) References Cited

U.S. PATENT DOCUMENTS

| 4,458,642 | A | * | 7/1984 | Okubo et al. | ........... 123/196 AB |
|---|---|---|---|---|---|
| 6,349,692 | B1 | * | 2/2002 | Reinosa | ...................... 123/196 S |
| 7,174,998 | B2 | * | 2/2007 | Pringle et al. | ................. 184/6.28 |
| 2003/0143084 | A1 | * | 7/2003 | Repple et al. | .................. 417/292 |
| 2004/0045749 | A1 | * | 3/2004 | Jaura et al. | .................... 180/65.2 |
| 2005/0205382 | A1 | * | 9/2005 | Tryon et al. | .................... 192/214 |
| 2006/0120876 | A1 | * | 6/2006 | Kitano et al. | .................... 417/42 |
| 2009/0232673 | A1 | * | 9/2009 | Reisch et al. | ................. 417/364 |

FOREIGN PATENT DOCUMENTS

WO    WO 2006099947  A1 *  9/2006

* cited by examiner

*Primary Examiner* — Tisha Lewis
(74) *Attorney, Agent, or Firm* — Timothy J. Klima; Shuttleworth & Ingersoll, PLC

(57) ABSTRACT

An auxiliary oil pumping system for an automatic transmission includes an auxiliary oil pump, the auxiliary oil pump being separate from an internal oil pump of the transmission but connected to an oil circuit of the automatic transmission to circulate oil in the system. An oil pump motor is connected to the auxiliary oil pump and selectively connectable to a power source for driving the auxiliary oil pump when a vehicle engine is off and the internal oil pump is not operating.

14 Claims, 3 Drawing Sheets

REMOTE OIL PUMPING SYSTEM FOR AN AUTOMATIC TRANSMISSION

The present application claims priority to U.S. Provisional Patent Application 61/064,607, filed Mar. 14, 2008, the entirety of which is incorporated by reference herein.

BACKGROUND OF THE INVENTION

The present invention relates to an auxiliary/remote oil pumping system for an automatic transmission, particularly with respect to automatic transmissions used in drag racing. Drag racing is a sport where cars compete against one another over ¼ mile distances from a standing start. The vast majority of drag racing cars use automatic transmissions and the automatic transmission are subjected to extreme loads over the all-out ¼ mile. It is common practice with such a car to select neutral in the automatic transmission and shut the motor off after clearing the finish line of the race. This practice is used to prevent engine damage that can occur from loss of engine oil pressure when slowing the vehicle causes oil in the engine's oil pan to surge forward and away from the oil pickup in the oil pan such that the oil pickup is exposed and sucks air. This practice is also used to eliminate connecting rod stretch from de-acceleration. Lifting off the throttle results in engine braking for the vehicle as the drive train operates against the engine compression. This, however, pulls the engine's rotating assembly in the opposite direction that it was designed for and can result in connecting rod stretch.

Cars subjected to this practice are often towed back to the pits without starting the engine again until the next race. The oil pump of an automatic transmission operates only when the engine is running and turning the torque converter, which drives the automatic transmission oil pump. This pressurizes the system and pumps fluid through the torque converter and transmission system. Thus, under the standard practice described above of shutting off the vehicle after the race is over, no oil is flowing in the transmission during such time that the engine is shut off.

SUMMARY OF THE INVENTION

The present invention is an auxiliary oil pumping system for an automatic transmission, which includes an oil pump, the oil pump being separate from an internal oil pump of the transmission but connected to an oil circuit of the automatic transmission to circulate oil in the system; and an oil pump motor, the oil pump motor connected to the oil pump and selectively connectable to a power source for driving the oil pump when a vehicle engine is off and the internal oil pump is not operating. Other details and aspects of the invention can be seen in the description below.

BRIEF DESCRIPTION OF THE DRAWINGS

The invention will be described in further detail below in conjunction with the attached figures, where like reference numerals indicate like components.

DETAILED DESCRIPTION

Figure 1:
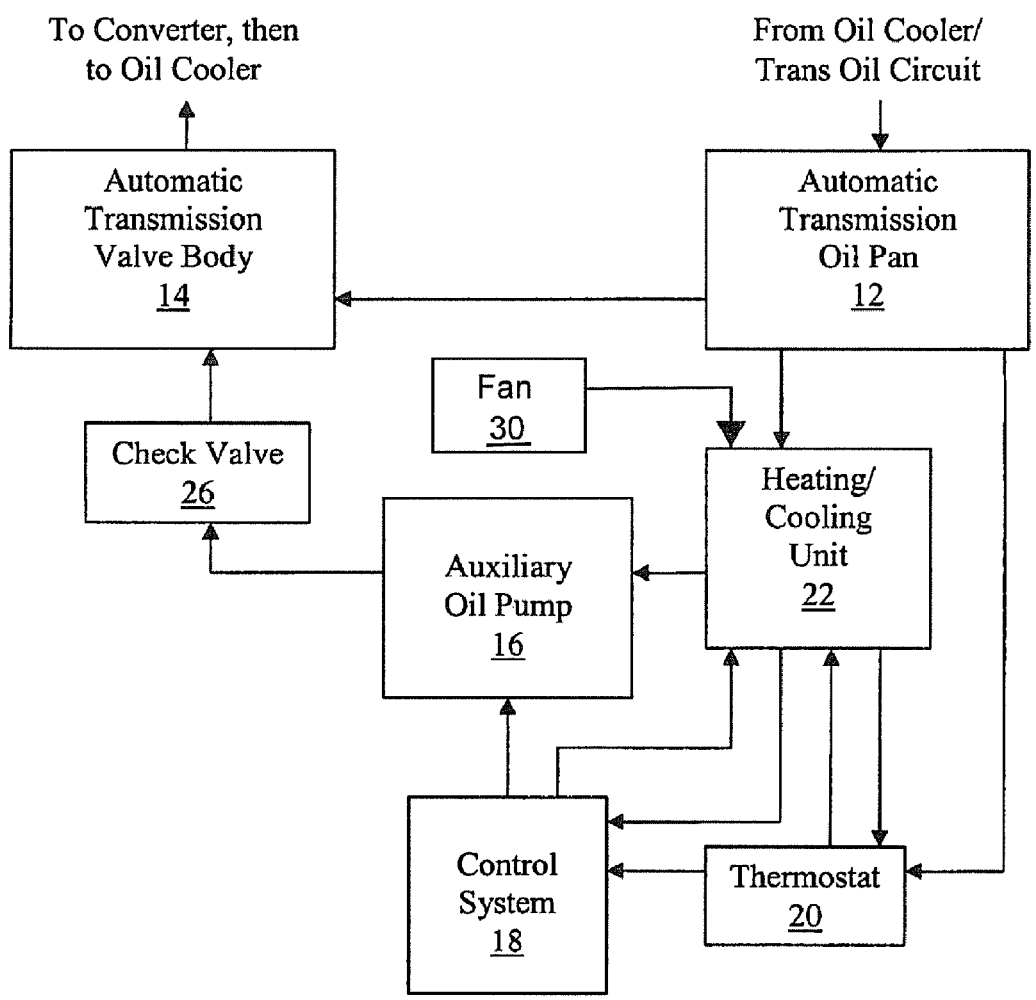
FIG. 1 is a schematic diagram of the present invention.

In a conventional automatic transmission 10, oil is suctioned from the oil pan 12 via an oil pick-up 24 and into the valve body 14, where it is routed to the conventional internal oil pump of the transmission 10. As is conventionally known, and therefore not shown in FIG. 1, the oil is then commonly routed from the oil pump, into the torque converter, out of the torque converter, to an external oil cooler, and from the oil cooler, through the transmission oil circuit and back into the oil pan 12.

Figure 3:
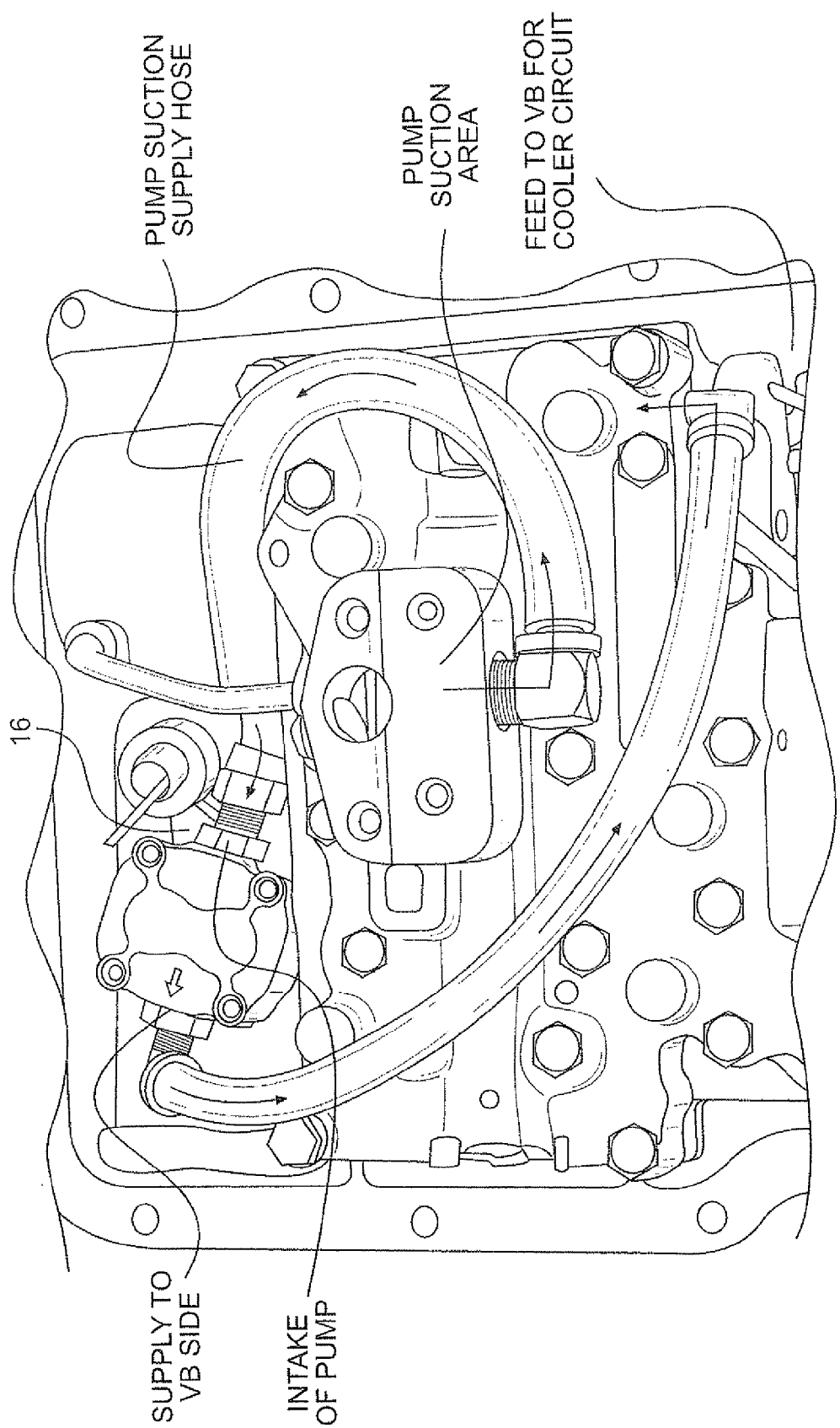
FIG. 3 is a partial view of an automatic transmission with an auxiliary pump of the present invention installed within the oil pan, showing oil flow to and from the auxiliary pump.

The present invention adds an auxiliary oil pump 16 into the conventional oiling system just described. In a preferred embodiment, the auxiliary oil pump 16 connects between the oil pan 12 and the valve body 14, although alternatively, the auxiliary oil pump 16 can be connected in at different portions of the conventional system. In the embodiment shown in FIG. 3, an intake of the auxiliary oil pump 16 is connected by tube to the transmission oil suction pickup body and an output of the pump 16 is connected by tube to the valve body 14 for supply to the converter.

The auxiliary oil pump 16 is preferably includes an electric motor so that it can be electrically driven from the car's (generally 12 volt) battery after the engine has been shut off and while the engine is not running. The auxiliary oil pump 16 can also be configured to operate from an AC or DC electrical source external to the car. The auxiliary oil pump 16 can also be configured to be driven by other than electricity, such as by air or hydraulically.

Figure 2:
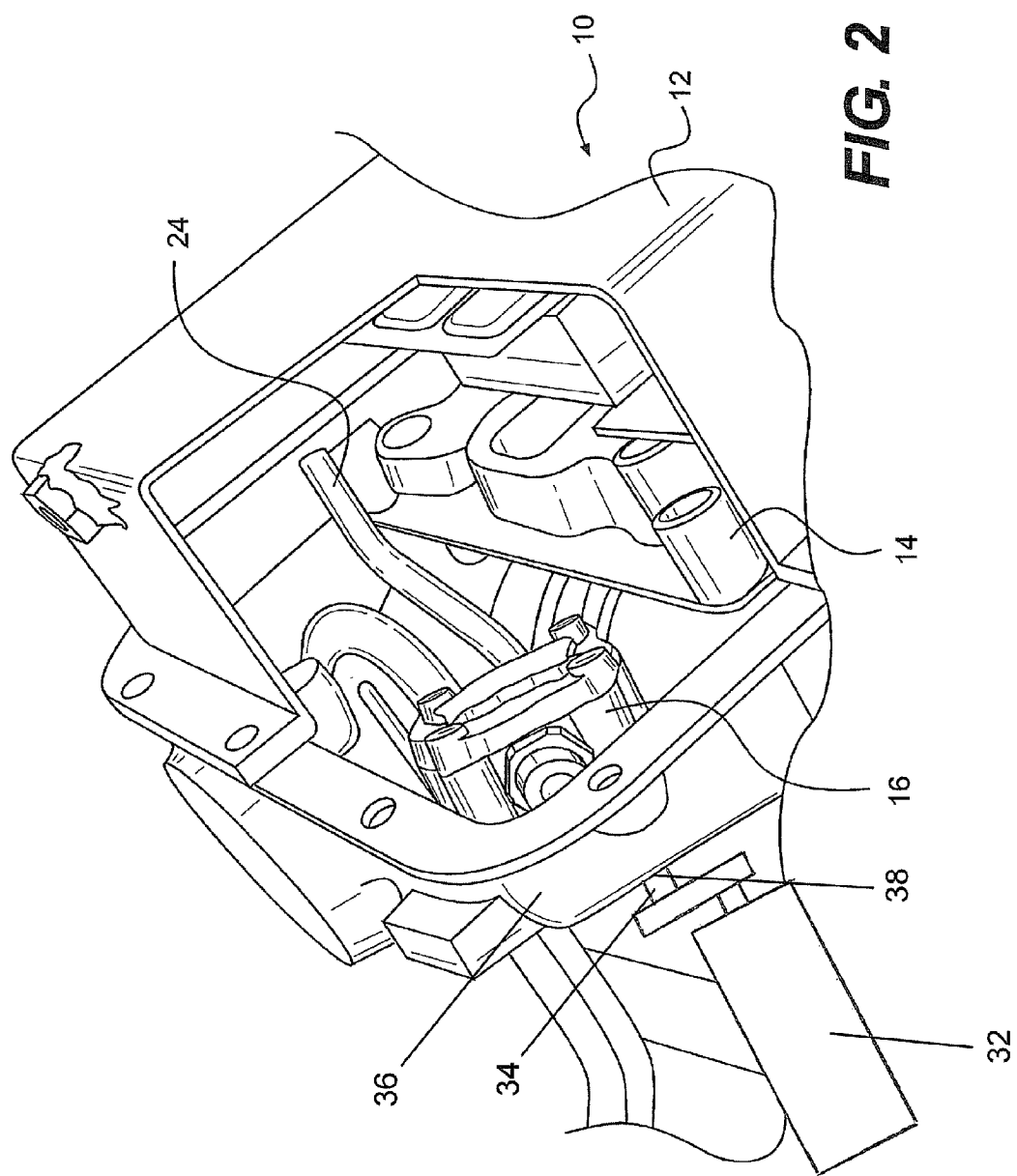
FIG. 2 is a partial view of an automatic transmission with an auxiliary pump of the present invention installed within the oil pan.

In one embodiment, the auxiliary oil pump 16 can be mounted within the oil pan 12 itself. See FIGS. 2 and 3. The auxiliary oil pump 16 can also be mounted external to the oil pan and use oil lines to connect to the transmission oil circuit. The auxiliary oil pump 16 can be provided with an integral electric motor or, alternatively, the auxiliary oil pump 16 and the motor 32 therefor can be separate components connected together. In such an alternative, the auxiliary oil pump 16 can be mounted within the oil pan 12 while the motor 32 is mounted external to the oil pan 12 and interconnected to the auxiliary oil pump 16 via a drive shaft 34 passing through an opening 38 in the oil pan 12 or other part of the transmission 36.

Use of the auxiliary oil pump 16 provides for continuing the circulation of the transmission oil through the transmission oil circuit once the engine has been shut off. This is very beneficial because immediately upon shutting off the engine under the above described circumstances, the internal components of the transmission are still rotating at high speeds, often 8000+ rpm, and the auxiliary oil pump 16 assures that they are adequately lubricated during the transition period between shutting off the engine (and the conventional oil pump) and the internal transmission components coming to rest. Thus, the auxiliary oil pump 16 prevents damage to the internal transmission components resulting from inadequate lubrication during the transition period.

The auxiliary oil pump 16 is also beneficial in that it continues to circulate the transmission oil through the oil cooler of the conventional oil circuit and thereby cools not only the transmission oil having been heated during the race, but also the transmission components with which the oil is in contact, even though the engine is shut down. Thus, the auxiliary oil pump 16 also helps prevent degradation of the oil, or damage to transmission components, from excess retained heat.

The auxiliary oil pump 16 can also be operated to lubricate internal transmission components prior to starting the engine. One of the real benefits of the auxiliary oil pump 16 is that oil can be circulated through the transmission, for all the reasons discussed herein and necessary, without having to start or run the very expensive motor and causing expensive wear thereto, burning expensive fuel or causing unnecessary emissions. Rather, this is handled by the relatively inexpensive, easily replaceable, non-emitting, electrically driven auxiliary oil pump 16.

The auxiliary oil pump 16 is controlled by a control system 18. The control system 18 can be as simple as a switch mounted on a control panel within reach of the driver that can be manually operated to switch the auxiliary oil pump 16 on and off, as the driver feels appropriate. The control system 18 can optionally utilize a thermostat 20 to control operation of the auxiliary oil pump based on the temperature of the transmission fluid in the transmission oil pan 12 (or the temperature can also be measured elsewhere in the system). When combined with a manual switching control system 18, with the manual switch in the on position, the thermostat can control when the auxiliary oil pump 16 operates based on the oil temperature, shutting off the auxiliary oil pump 16 when the oil temperature falls below a certain, selectable, limit and turning on the auxiliary oil pump should the temperature rise above a certain, selectable limit.

The control system can also be more sophisticated and include some type of automatic controller or CPU that can analyze certain factors and based on a predetermined set of criteria, control whether the auxiliary oil pump is on or off. Such a system might sense, for instance, whether the engine is on or off, the rpm of the engine, the oil temperature, ambient temperature, etc. Such a control system 18 could also use the thermostat 20 or have an internal thermostatic control.

In addition, an auxiliary heating and/or cooling unit 22 can be installed in the oil circuit to either increase the temperature of the transmission oil or to decrease the temperature of the transmission oil. In the first instance, some form of heater can be installed in the oil pan 12, or elsewhere in the oil circuit, to heat the transmission oil. By placing a thermostatically controlled heater in the oil pan, the temperature of the transmission oil can be increased (or decreased, as discussed below) to a desired and consistent operating temperature before the car is run, so the oil temperature is consistently the same at the start of the run. This controlling of the temperature of the transmission oil to a known consistent operating temperature can improve the operational consistency and elapsed times of the car from run to run, which is extremely important in bracket drag racing. The heater can be connected to the same, or another, power source as the auxiliary oil pump 16, so that it can operate when the engine is off.

An integrated, or separate, oil cooler can optionally be used to assist the vehicle transmission oil cooler in likewise decreasing the temperature of the transmission oil, either after a run, or even before a run to bring the oil temperature to the desired temperature for starting a run. This cooling portion of unit 22 can have a dedicated fan 30 and be connected to the same, or another, power source as the auxiliary oil pump 16, so that oil cooler can similarly operate when the engine is off. The heating and/or cooling unit 22 can be connected to the thermostat 20 so that the thermostat can sense the temperature of the transmission oil after heating/cooling and then control the unit 22. Also, the unit 22 can be controlled by the control system 18.

A one way check valve 26 is preferably installed in the circuit to eliminate the engine driven pump from discharging oil back to the auxiliary oil pump 16 and its circuit while the engine is running. Such back discharge reduces the effectiveness of the engine driven pump and is undesirable. The auxiliary oil pump 16 can be sized as appropriate for the specific application. In one embodiment, the pump is sized to provide the normal 2.5-4 PGM that is generated by the main engine-driven transmission pump.

The auxiliary oil pump 16, and especially a pump mounted externally of the transmission, can be connected into the transmission oil circuit using bulkhead fittings, Teflon braided line, and quick disconnects, to ease the connection of the pump to and removal of the pump from the transmission oil circuit, for replacement, substitution or even to gain quick access to the transmission oil circuit to flush and/or replace the transmission oil. An internal oil pump can also do so by disconnecting an external line connected thereto and pumping oil from that opened line.

In one embodiment, the auxiliary pump is not normally installed on the car during the race but is kept remote at the trailer or pits, and can utilize the quick disconnects to quickly plug into the transmission oil circuit and circulate the oil to cool the transmission and converter between rounds. In such an embodiment, the auxiliary pump can be the only remote pump 16, or, can be a secondary remote pump that is used in place of the primary remote pump when the car is in the pits and has access to external power. For instance, the primary remote pump 16 can be utilized as soon as the engine is shut down and until the car is at the pits, utilizing the car's battery for power. However, once the car is at the pits, the secondary remote pump can then be connected (or remain connected) and utilized, driven by an external power source so as not to drain the car's battery, and the primary remote pump shut down.

While the present invention has been described above in connection with a drag racing car, its use is not so limited and it can be used with other vehicles having automatic transmissions, whether such vehicles are used for drag racing or for alternative purposes.

Various aspects of the various embodiments can be combined in different configurations to create different embodiments. The present invention is not limited to the disclosed embodiments.

LIST OF COMPONENTS

10 Automatic transmission
12 Automatic transmission oil pan
14 Automatic transmission valve body
16 Auxiliary oil pump/integrated motor
18 Control system
20 Thermostat
22 Heating/cooling unit
24 Oil pick-up
26 Check valve

What is claimed is:

1. An auxiliary oil pumping system for an automatic transmission, comprising:
   an auxiliary oil pump, the auxiliary oil pump being separate from an internal oil pump of the transmission but connected to an oil circuit of the automatic transmission to circulate oil in the system, the auxiliary oil pump being located internally of an oil pan of the automatic transmission;
   an oil pump motor, the oil pump motor connected to the auxiliary oil pump and selectively connectable to a power source for driving the auxiliary oil pump when a vehicle engine is off and the internal oil pump is not operating; and
   an oil pump drive shaft interconnecting the oil pump motor and the auxiliary oil pump, wherein the oil pump motor is located externally of the pan of the automatic transmission and the oil pump drive shaft passes through an opening in the automatic transmission.

2. The auxiliary oil pumping system of claim 1, wherein the oil pump motor is electrically powered by an electrical system of a vehicle in which the automatic transmission is installed.

3. The auxiliary oil pumping system of claim 1, wherein the oil pump motor is electrically powered by an electrical system separate from a vehicle in which the automatic transmission is installed.

4. The auxiliary oil pumping system of claim 1, and further comprising a control system for controlling operation of the auxiliary oil pump.

5. The auxiliary oil pumping system of claim 4, wherein the control system includes a thermostat for turning on the auxiliary oil pump based on a temperature of oil in the oil circuit.

6. The auxiliary oil pumping system of claim 5, wherein the control system includes a CPU that can analyze certain factors and based on a predetermined set of criteria, control whether the auxiliary oil pump is on.

7. The auxiliary oil pumping system of claim 6, wherein the certain factors analyzed by the control system include at least one of, whether the vehicle engine is on, an rpm of the engine, an oil temperature, and an ambient temperature.

8. The auxiliary oil pumping system of claim 1, and further comprising a one way check valve installed between the auxiliary oil pump and the oil circuit of the automatic transmission to prevent the internal oil pump from discharging oil back to the auxiliary oil pump while the vehicle engine is running.

9. The auxiliary oil pumping system of claim 1, and further comprising a heater connected to the auxiliary oil pump to heat oil pumped by the auxiliary oil pump.

10. The auxiliary oil pumping system of claim 9, and further comprising a temperature control unit for controlling a temperature to which the oil is heated by the heater.

11. The auxiliary oil pumping system of claim 5, and further comprising an oil cooler connected to the auxiliary oil pump to cool oil pumped by the auxiliary oil pump, the oil cooler separate from a transmission oil cooler of the vehicle.

12. The auxiliary oil pumping system of claim 11, and further comprising a fan for directing air through the oil cooler.

13. The auxiliary oil pumping system of claim 1, and further comprising an oil cooler connected to the auxiliary oil pump to cool oil pumped by the auxiliary oil pump, the oil cooler separate from a transmission oil cooler of the vehicle.

14. The auxiliary oil pumping system of claim 1, and further comprising a fan for directing air through the oil cooler.

* * * * *